2 Sheets—Sheet 1.

H. GROSWITH.

Assignor, by direct and mesne assignments, to THE KENNEDY-GROSWITH ELECTRIC COMPANY.

ELECTRIC MOTOR.

No. 11,210. Reissued Dec. 15, 1891.

WITNESSES:

F. L. Ourand

Arthur B. Seibold

INVENTOR:

Henry Groswith by Louis Bagger & Co.

his Attorneys

2 Sheets—Sheet 2.

H. GROSWITH.

Assignor, by direct and mesne assignments, to THE KENNEDY-GROSWITH ELECTRIC COMPANY.

ELECTRIC MOTOR.

No. 11,210. Reissued Dec. 15, 1891.

WITNESSES:
F. L. Durand
Arthur B. Seibold

INVENTOR:
Henry Groswith
by Louis Bagger & Co.
his Attorneys.

UNITED STATES PATENT OFFICE.

HENRY GROSWITH, OF PHILADELPHIA, PENNSYLVANIA, ASSIGNOR, BY DIRECT AND MESNE ASSIGNMENTS, TO THE KENNEDY-GROSWITH ELECTRIC COMPANY, OF SAME PLACE.

ELECTRIC MOTOR.

SPECIFICATION forming part of Reissued Letters Patent No. 11,210, dated December 15, 1891.

Original No. 441,954, dated December 2, 1890. Application for reissue filed October 26, 1891. Serial No. 409,907.

*To all whom it may concern:*

Be it known that I, HENRY GROSWITH, a citizen of the United States, and a resident of Philadelphia, in the county of Philadelphia and State of Pennsylvania, have invented certain new and useful Improvements in Electric Motors; and I do hereby declare that the following is a full, clear, and exact description of the invention, which will enable others skilled in the art to which it appertains to make and use the same, reference being had to the accompanying drawings, which form a part of this specification.

My invention consists in certain improvements in electric motors, whereby certain currents are employed or used as an auxiliary means for energizing the field-magnets of the motor.

Figure 1:
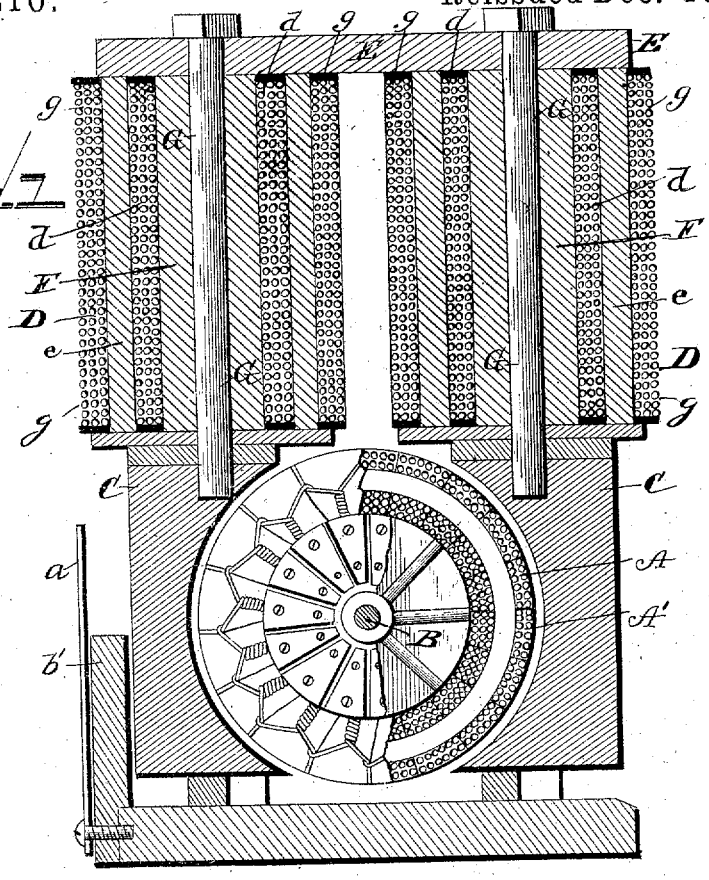
Figure 2:
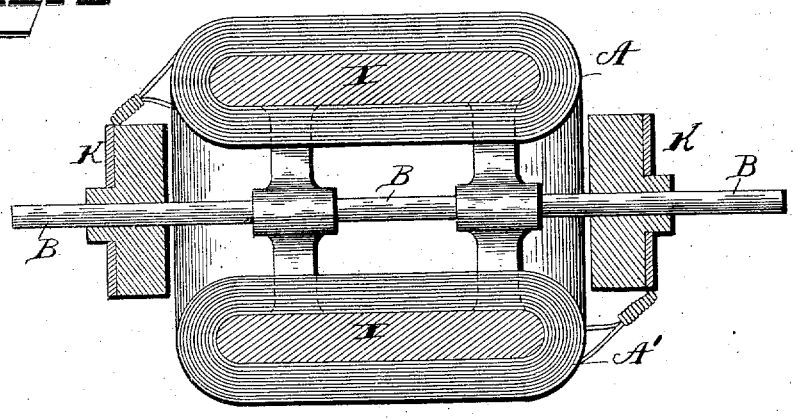
Figure 2:
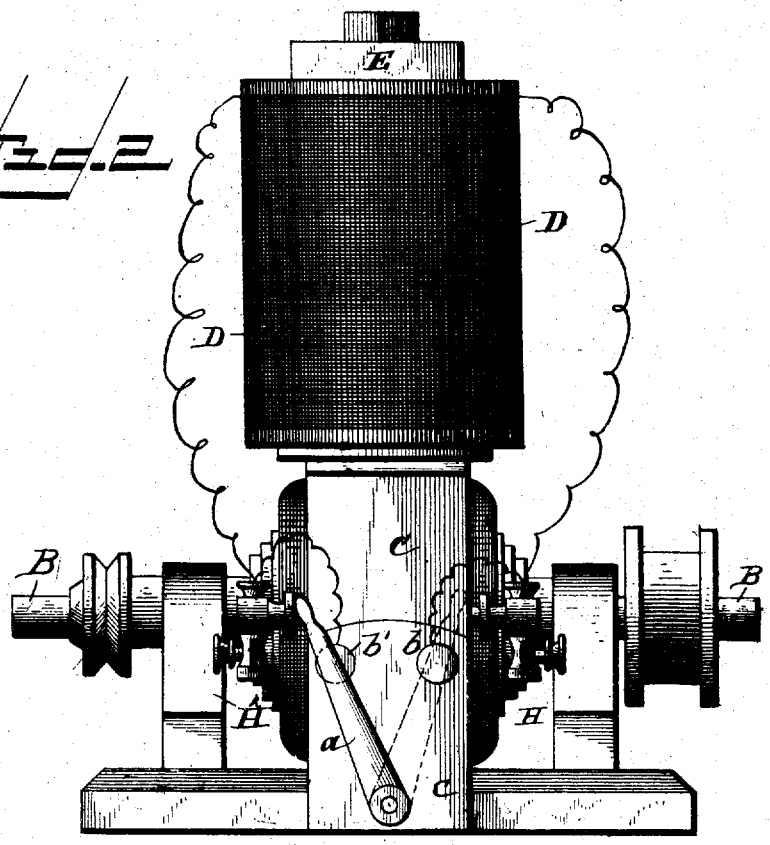
Figure 4:
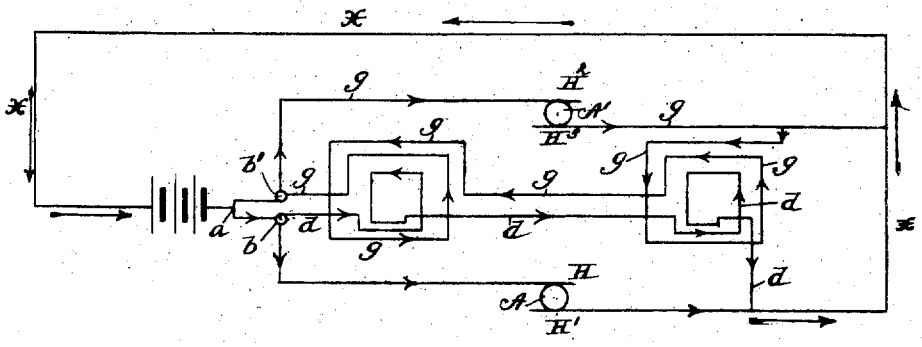

In the accompanying drawings, illustrating one form of apparatus for carrying my invention into effect, Figure 1 represents a vertical sectional view of the motor. Fig. 2 is an end view of the same. Fig. 3 is a sectional view of the armature, and Fig. 4 is a diagrammatic view showing the circuits through the field-magnets, armature, and induction-coils, like letters of reference denoting corresponding parts in all the figures.

Referring to the drawings, the letter A designates the armature-coil; A′, the induction-coil; B, the armature-shaft; C, the pole-pieces; D, the field-magnets, and E the yoke or cross-head which connects the cores of said magnets.

The field-magnets are exact duplicates of each other and are constructed as follows: I first wire the cylindrical cores F F, having axis cores or apertures for the reception of the bolts G, by which they are respectively connected at opposite ends to the yoke E and pole-pieces C. Next I wind each of these cores with a wire *d* until the proper thickness has been attained, and then connect one terminal of said wire *d* with a switch-plate or contact-post *b*, which may be electrically connected by means of a switch-lever *a* with a dynamo or other form of generator. The other terminal of wire *d* is connected with the armature-brush H′, (see the diagram,) and also with a return conductor or wire *x*, leading back to the generator. The electro-magnets thus formed I call the "primary" cores, and the next step is to form a "secondary" core *e* around each magnet of soft iron of proper thickness, Fig. 1, which is then wound with another wire *g*, after which the completed cores are magnetically connected by means of the yoke E. One of the terminals of this wire *g*, which appertains to the secondary cores, is connected with the other switch-plate or contact *b′*, while the other terminal is connected with the brush $H^3$, appertaining to the induction-coil of the armature, and also with the conductor *x*.

The letter I designates the armature-core, and K K the commutator-plates. These are of the usual construction, except that commutators are placed on each side of the machine, each being provided with its appropriate pair of brushes H H′ on one side and $H^2$ $H^3$ on the other side.

The armature and induction-coils consist of a number of separate wires wound upon the core, the terminals of each series—*i. e.*, of alternate coils or bobbins, being electrically connected to the commutator on one side of the machine, while the terminals of the other series are similarly connected to the commutator on the other or opposite side of the machine. It will thus be seen that there are formed on the armature two series or sets of separate and distinct coils which are electrically disconnected from each other, and one of which, designated with the reference-letter A on the drawings, forms the armature-coil through which the current from the generator passes to energize it, while the other coil marked A′ forms an induction-coil, the induced current of which is carried away by brush $H^3$ through the wire *g* and around the secondary cores of the field-magnets, thus assisting in energizing said magnets and thereby increasing their power.

The circuit is as follows, (see Fig. 4:) from the dynamo or generator through switch *a* to the contact *b*, through wire *d* in the direction indicated by the small dart-points, around the inner or primary cores of the field-magnets to conductor *x*, and back to generator, as indicated by arrows; also from contact *b*, through armature-coil A, (by way of brushes H and H′,) to conductor *x*, and back to generator. At the same time the current induced in the induction-coil A′ of the armature flows through brush $H^3$ into wire *g* and around the secondary cores of the field-magnets in the direction of the dart-points—*i. e.*, in the same direction as the direct or primary current which flows from the generator through wire *d*—and then through brush $H^2$ back to the induction-coil A′, thus materially increasing the effectiveness of the field-magnets, as will be apparent. By shifting switch *a* so as to connect the generator with the other contact or switch-plate *b′* the direction of the currents in the field-coils and armature-coils is changed and the operation of the motor reversed, the armature-coil A now becoming the induction-coil, and vice versa. The main or direct current from the generator now flows through wire *g* around the outer (secondary) cores and what was before the "induction-coil" A′, while the induced current is set up in "armature-coil" A and flows through wire *d* around the primary cores of the field-magnet, reversing the motor.

From the foregoing it will observed that I utilize the inductive effects of both field and motor current in increasing the effect of the field-magnets and at the same time materially reduce the sparking due to self-induction in the armature-wires. I also produce a ready and simple reversing device and a motor capable of being quickly reversed.

Having thus described my invention, I claim and desire to secure by Letters Patent of the United States—

1. In an electric motor, the combination of an armature-core wound with two sets of coils, two commutators, brushes, a field-magnet having two sets of coils, one terminal of each set being connected to one brush of its respective commutator and to a common conductor and the other terminal of each set of field-coils being connected to the other corresponding brush and to a contact or binding post for external connection.

2. An electric motor having a set of field-coils, armature-coils, and commutator in one circuit, a duplicate set of elements, a common external connection to one brush of each commutator, and a pair of contacts or binding-posts connected, respectively, to the two other brushes for external connection.

In testimony whereof I affix my signature in presence of two witnesses.

HENRY GROSWITH.

Witnesses:
CHAS. N. ANDERSON,
HOWARD BURKE.